United States Patent [19]

Koerner et al.

[11] Patent Number: 4,487,809
[45] Date of Patent: Dec. 11, 1984

[54] PROCESS FOR THE SYNTHESIS OF A WATER-DILUTABLE, HEAT-CURABLE ORGANOPOLYSILOXANE, MODIFIED WITH ORGANIC POLYOLS

[75] Inventors: Götz Koerner, Essen; Manfred Priesch, Recklinghausen; Harald Rau; Eckehard Schamberg, both of Essen, all of Fed. Rep. of Germany

[73] Assignee: Th. Goldschmidt AG, Essen, Fed. Rep. of Germany

[21] Appl. No.: 482,948

[22] Filed: Apr. 7, 1983

[30] Foreign Application Priority Data

Apr. 22, 1982 [DE] Fed. Rep. of Germany ....... 3214985

[51] Int. Cl.$^3$ ............................................. B32B 9/04
[52] U.S. Cl. ................................... 428/447; 524/588; 528/26; 427/387
[58] Field of Search .......................... 528/26; 428/447; 524/588; 427/387

[56] References Cited

U.S. PATENT DOCUMENTS

| | | | |
|---|---|---|---|
| 4,035,332 | 7/1977 | Gomyo et al. | 524/761 |
| 4,069,178 | 1/1978 | Mikami et al. | 524/588 |
| 4,331,797 | 5/1982 | Martin | 528/26 |
| 4,408,031 | 10/1983 | Holtschmidt et al. | 528/26 |

Primary Examiner—Melvyn I. Marquis
Attorney, Agent, or Firm—Toren, McGeady and Stanger

[57] ABSTRACT

Heat-curable vehicles and a process for their preparation which can be diluted with water after neutralization, by the partial reaction of a low molecular weight alkoxysiloxane with a low molecular weight polyol having carboxyl groups and at least two hydroxyl groups. The vehicle dissolves in water, optionally in the presence of slight amounts of auxiliary solvents, highly concentrated solutions being obtained with a solids content of 80 weight percent or higher, yet a relatively low viscosity.

15 Claims, No Drawings

PROCESS FOR THE SYNTHESIS OF A WATER-DILUTABLE, HEAT-CURABLE ORGANOPOLYSILOXANE, MODIFIED WITH ORGANIC POLYOLS

BACKGROUND OF THE INVENTION

1. Field of the Invention

The invention relates to a process for the synthesis of a coating vehicle, which can be diluted with water after neutralization, by partially reacting an alkoxysiloxane with an at least difunctional polyol having carboxyl groups, especially in the presence of a catalyst.

2. Description of the Prior Art

It is well known that the properties of heat-curable silicone resins may be improved by modifying them with organic compounds. Examples of such organic compounds are polyester polyols. In the cured state, the reaction products combine the good properties of the silicone resins with those of the organic polyester resins. By additionally incorporating carboxyl groups, it is possible to transform such modified organopolysiloxanes into a water-soluble form, by neutralizing the carboxyl-group-containing, modified organopolysiloxanes with amines. Preferably, amines are used which are substantially removed from the vehicle system under the conditions of curing.

U.S. Pat. No. 4,035,332 discloses that water-soluble, organic modified silicone resins can be synthesized by reacting an organosiloxane, having alkoxy or hydroxy groups, with a polyester which is synthesized from a polyol and a multibasic carboxylic acid or a carboxylic anhydride and has an acid number of 10 to 150. As the multibasic carboxylic acid or polycarboxylic anhydride, phthalic acid or phthalic anhydride, fumaric acid, maleic anhydride, trimellitic anhydride or compounds of similar structure are used.

U.S. Pat. No. 4,069,178 discloses a process for the synthesis of a water-soluble, silicone-modified alkyd resin, in which the alkyd resin is also reacted with an organopolysiloxane having alkoxy or hydroxy groups, the reaction product being reacted further with a multibasic carboxylic acid in order to introduce carboxyl groups.

The viscosity of these vehicles is relatively high. It is therefore necessary to dissolve them in large amounts of solvent. At the same time, they are neutralized and converted into an aqueous solution or dispersion. The aqueous preparation of these resins therefore contains considerable amounts of organic solvents, which may have to be removed either before or as the resins are cured.

SUMMARY OF THE INVENTION

We have discovered organic modified polysiloxanes having a low viscosity, which are water-dilutable after neutralization. With the inventive polysiloxanes, it is possible to neutralize the silicone resins in the presence of only slight amounts of solvent. In particular, resin solutions can be neutralized which have a resin content of 80 weight percent or more. The aqueous preparations prepared from these resins would then have only a slight organic solvent content. At the same time, however, the desired properties of the modified silicone resins are retained.

More particularly, the inventive compounds can be prepared by reacting:

(a) an alkoxysiloxane having the formula

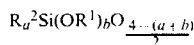

wherein
$R^1$ is a lower alkyl radical with up to 4 carbon atoms,
$R^2$ is an alkyl or phenyl group, and
$a = 1.0$ to $1.2$,
$b = 0.5$ to $1.2$,
with the proviso that at least 50 weight percent of the alkoxysiloxane is distillable at 1 to 15 mbar with siloxanes having the formula $[R^2Si(OR^1)O]_n$ being preferred, wherein n is from 3 to 8; with (b) a polyol which is the reaction product of monoanhydride of a polycarboxylic acid with a compound having the formula

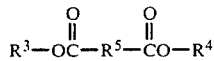

in which $R^3$ and $R^4$ may be the same or different and represent the groups

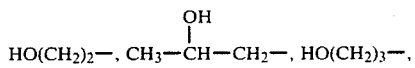

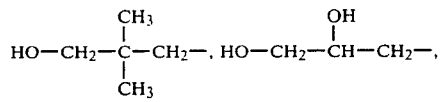

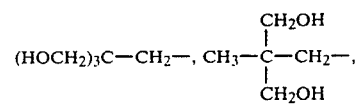

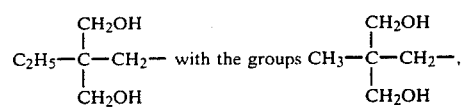

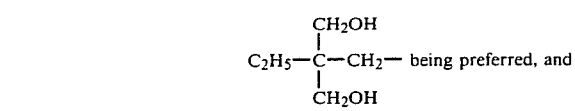

wherein there are at least three hydroxyl groups in the molecule and $R^5$ is an alkylene, cycloalkylene or phenylene group, said reaction product containing at least two hydroxyl groups,
the alkoxysiloxane being reacted with the polyol to a degree of reaction of not more than 70%, but at least to the degree that a clear solution is obtained. Preferably, the ratio of $SiOR^1/COH$ is $0.8$ to $1.2$.

DESCRIPTION OF THE PREFERRED EMBODIMENT

The inventive process is therefore characterized particularly by the use of lower molecular weight alkoxysiloxanes and lower molecular weight polyols having carboxyl groups.

The alkoxysiloxane used for the reaction, can be synthesized by known procedures, for example, by hydrolyzing and condensing appropriate alkoxysilanes at temperatures of about 60° C. Those polysiloxanes are preferred wherein at least 50 weight percent of the alkoxysiloxane correspond to the formula $[R^2Si(OR^1)O]_n$, in which n has a value of 3 to 8. The alkoxysiloxane generally contains about 80 weight percent of components which are sufficiently low molecular weight so as to be distillable at a reduced pressure of about 1 to 15 mbar. This low molecular weight structure is an important prerequisite of the inventive process, since it is responsible, in part, for the formation of low viscosity, modified organosiloxanes. In this connection, it was surprising to those skilled in the art that, after alkoxysiloxanes of such low molecular weight are reacted with polyols, they can be crosslinked at a desirable rate of curing.

In the alkoxysiloxanes, $R^1$ is a lower alkyl group with 1 to 4 carbon atoms, which may be linear or branched in the case of the higher number of carbon atoms. $R^2$ is an alkyl or phenyl group. The methyl group is the preferred alkyl group. Particularly advantageous results are obtained, if alkoxysiloxanes are used in which more than 5% of the number of $R^2$ groups are phenyl groups.

The polyol chosen for reacting with the alkoxysiloxane is important. The polyols are obtained by reacting a compound of the general formula $$R^3-OC(O)-R^5-C(O)O-R^4$$

with the monoanhydride of a carboxylic acid, it being necessary for the reaction product to contain at least two hydroxyl groups.

$R^3$ and $R^4$ are the same or different and represent the groups

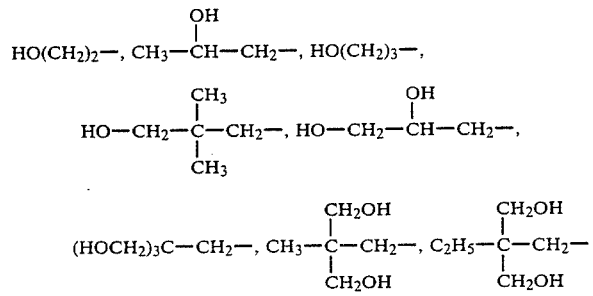

The groups

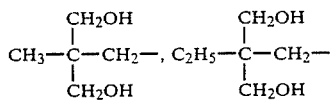

are preferred.
There must, however, be at least three hydroxyl groups in the molecule. This means that the groups

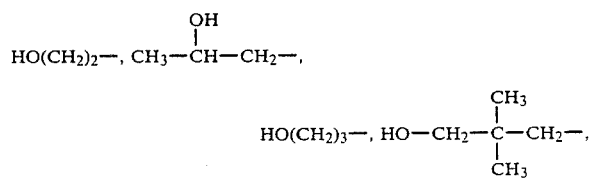

can only represent $R^3$ or $R^4$, and not $R^3$ and $R^4$ simultaneously. This polyol is reacted with the monoanhydride of a polycarboxylic acid in such amounts, that the reaction product must still contain at least two hydroxyl groups. If the starting material is a polyol with three OH groups, it can be reacted with at most 1 mole of the monoanhydride of the polycarboxylic acid. If the molecule has four hydroxyl groups, it can be reacted with, at most, 2 moles of the anydride of the polycarboxylic acid. If the number of OH groups in the polyol is p, this polyol can be reacted with at most p−2 moles of the monoanhydride of the polycarboxylic acid.

$R^5$ represents a bivalent hydrocarbon bridge. $R^5$ therefore is an alkylene, cycloalkylene or phenylene group. If $R^5$ is an alkylene group, it preferably has 3 to 7 carbon atoms. If $R^5$ is a cycloalkylene group, the cyclohexylene group is preferred. Especially preferred are the 1,4- and 1,3-phenylene groups. Due to conditions related to the synthesis, oligomeric ester polyols of these compounds may also be present in minor amounts. In this connection, oligomeric ester polyols are defined as compounds, in which the dicarboxylic acid unit occurs more than once.

As the monoanhydride of a polycarboxylic acid, phthalic anhydride, tetrahydrophthalic anhydride, maleic anhydride, trimellitic anhydride or hexahydrophthalic anhydride may be used. The use of phthalic anhydride or trimellitic anhydride is especially preferred, because vehicles, prepared with these, are are particularly resistant to yellowing.

The alkoxysiloxane and the polyol are preferably reacted in amounts such that the quotient $SiOR^1/COH=0.8$ to 1.2. A quotient of about 1 is especially preferred.

The reaction of the reactants is carried out up to a maximum degree of conversion of about 70% and then terminated. The remainder of the conversion and the curing of the product take place on the surface to be coated. If a lower degree of conversion is selected, care must be taken to make certain that the reaction is carried out far enough so that a clear solution of the products in one another is obtained. This compatibility depends on the nature of the alkoxysiloxane and the polyol used. In general, starting materials and reaction products become mutually compatible at a conversion of about 40 to 50%. These solutions then also remain clear on cooling.

The reaction of the alkoxysiloxanes and the curing take place using catalysts. It is known that titanate esters can be used for this purpose. They can also be used in the inventive process. An example of such a titanate ester is tetrabutyl titanate.

This catalyst can also be used for curing the product of the process during stoving. It has, however, turned out that particularly advantageous properties of the stoved coating are obtained when a compound, obtained by reacting 2 moles of a polyol having the formula

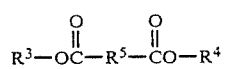

with 2 to 4 moles of phthalic or trimellitic monoanhydride and 1 mole of $Ti(OR^6)_4$, is added as curing catalyst to the partial reaction product in amounts of 0.2 to 1.5 weight percent, based on the solid resin. $R^3$, $R^4$ and $R^5$ have the meanings already given. Independent of the nature of the group, however, $R^3$ and $R^4$ may be same or different. However, the condition that the polyol which is reacted with the anhydride, has at least one free OH group, must be fulfilled. In this connection, $R^6$ is an alkyl group with 1 to 6 carbon atoms. When using this reaction product as a catalyst, the storage stability of the resins, the crosslinking density of the stoved resins, and their mechanical and chemical stabilities, especially in the presence of aqueous media, are increased. A further advantage of the catalyst is its good solubility in the partially reacted product of the alkoxysiloxane and the polyol which is to be used inventively.

The inventively produced vehicles have the required low viscosity. For example, solutions with a resin content of 80 weight percent have a viscosity of about 2,000 to about 5,000 cSt at 25° C. Solutions of this viscosity can be handled well, so that the inventively prepared vehicles may be neutralized without difficulty, especially with low boiling amines, such as, for example, triethylamine or dimethylethanolamine.

Aqueous preparations, based on the inventively produced vehicles, give coatings having excellent properties on a large number of substrates. Preferably, the inventively prepared vehicles are suitable for coating sheet metal and metal objects. The coatings are distinguished by a high flexibility, slight thermal plasticity, and high thermal stability. In this connection, the short curing times are particularly advantageous.

The following examples illustrate the present invention:

EXAMPLE 1

(a) Synthesis of Ester Polyols Containing Carboxyl Groups

Dimethyl terephthalate (194 g, 1 mole), 268 g (2 moles) of 2,2-dihydroxymethylbutan(1)ol (trimethylolpropane) and 35 g of diglycoldimethylether are heated in a flask. When a temperature of 140° C. is reached, 0.5 g of magnesium acetate are added. The temperature is now raised over a period of 3 hours to 240° C. During this time, 89 g of distillate are obtained, 64 g of which are methanol. The contents of the flask are cooled slowly. When a temperature of 140° C. is reached, 230 g (1.55 moles) of phthalic anhydride as well as 100 g of diglycoldimethylether are added, the solution is held at 140° C. for 30 minutes and then cooled to room temperature. The product is the result of 85% conversion. Gel chromatographic analysis reveals an oligomeric ester polyol content of 35%.

(b) Synthesis of a Phenylethoxypolysiloxane

Phenyltriethoxysilane (240 g, 1 mole) is mixed with 100 g of anhydrous ethanol and the solution is heated with stirring to 60° C. At this temperature, a mixture of 162 g of ethanol and 18 g (1 mole) of water is added dropwise within 30 minutes. Residual hydrochloric acid, present in this starting silane, acts as the hydrolysis catalyst. The excess ethanol is subsequently distilled off under reduced pressure.

The polymer mixture has an average ethoxy content of 25%; 80% of the product can be distilled over at 180° C. and 2 torr, and this distillate has an ethoxy value of 27% and a molecular weight of 830. It therefore corresponds to the formula $[C_6H_5\text{-}Si(OC_2H_5)O]_5$.

(c) Synthesis of a Modified Organopolysiloxane

The ester polyol (738 g, 85% solution) prepared in (a) is heated to 135° C. together with 628 g of the phenylethoxypolysiloxane prepared in (b), and 1.5 g of tetrabutyl titanate dissolved in 13.5 g of diglycoldimethylether. Within 30 minutes, 85 g of distillate are obtained. The product is cooled and, on reaching 80° C., adjusted to a theoretical solids content of 80% with 195 g of isopropanol. The viscosity of the product is approximately 3,500 cSt at 25° C.; the acid number is 58 mg KOH.

(d) Synthesis of a Curing Catalyst

The ester polyol (44.3 g of the 85% solution; 0.06 moles) prepared in (a), together with 10 g of diglycoldimethylether, is slowly added dropwise to a solution of 10 g (0.03 moles) of tetrabutyl titanate, dissolved in 15 g of diglycoldimethylether, which has been heated to 130° C. Butanol is distilled off during the addition. The amount of distillate, immediately after the completion of the addition, is 7 g. The product is cooled.

(e) Testing the Application

Preparation of White-Pigmented Water-Based Paints

The modified organopolysiloxane (50 g, solids content of 80%), synthesized in (c), is mixed with stirring with 3.7 g of dimethylethanolamine. After 10 minutes, 40 g of titanium dioxide, together with 70 g of deionized water and approximately 10 ml of glass beads (2 mm diameter), are added. The mixture is shaken for 1 hour. The glass beads are subsequently removed with the help of a screen. The paint has a solids content of approximately 50% (paint sample 1).

A white-pigmented water-based paint is prepared in the manner just described, 0.6 weight percent of the catalyst solution, prepared in (d), being added to the modified organopolysiloxane. The amount of catalyst is based on the vehicle solids (paint sample 2).

The water-based paints are applied with a 100 μm doctor blade on test sheets (Bonder 1401 AL). After the coated sheets are exposed to air for 15 minutes, they are cured for 10 minutes at 270° C.

The following results were obtained when testing the coated sheets:

|  | 1 | 2 |
|---|---|---|
| Wolff-Wilborn Hardness |  |  |
| at 20° C. | 3 H | 4 H |
| at 150° C. | 3 H | 4 H |
| Yellowing according to Hunter Lab. b-value of sample |  |  |
| at zero time | ±0 | −0.3 |
| after 3 hours at 300° C. | +1.3 | +1.1 |
| Adhesion |  |  |
| Grid cutting according to DIN 53151 |  |  |
| sample at zero time | GTO | GTO |
| after 3 hours at 300° C. | GTO | GTO |
| Detergent Test | moderate attack | slight attack |
| after 3 hours | severe loss of gloss, severe chalking | slight loss of gloss, slight chalking |

We claim:

1. A process for the synthesis of a heat-curable vehicle for coatings which can be diluted with water after neutralization comprising reacting in the presence of a catalyst (a) an alkoxysiloxane having the formula

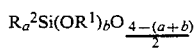

wherein $R^1$ is a lower alkyl radical with up to 4 carbon atoms,
$R^2$ is an alkyl or phenyl groups, and
a = 1.0 to 1.2,
b = 0.5 to 1.2,
with the proviso that at least 50 weight percent of the alkoxysiloxane is distillable at 1 to 15 mbar; with (b) a polyol which is the reaction product of a monoanhydride of a polycarboxylic acid and a compound having the formula

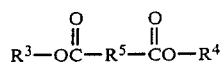

in which $R^3$ and $R^4$ may be the same or different and represent the groups

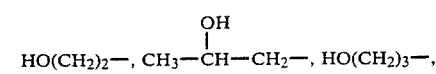

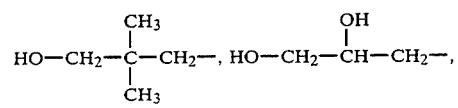

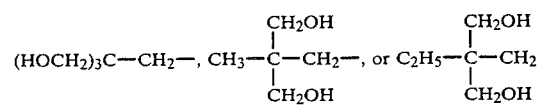

and there are at least three hydroxyl groups in the compound and $R^5$ is an alkylene, cycloalkylene or phenylene group; wherein the reaction product contains at least two hydroxyl groups; the alkoxysiloxane being reacted with the polyol to a degree of reaction of not more than 70% but to an extent that a clear solution is obtained.

2. The process of claim 1 wherein the siloxane has the formula $$[R^2Si(OR^1)O]_n$$

wherein n is from 3 to 8.

3. The process of claim 1 wherein the alkoxysiloxane and the polyol are used in amounts such that the quotient $SiOR^1/COH$ is 0.8 to 1.2.

4. The process of claim 1 wherein $R^5$ is a 1,4- or a 1,3-phenylene group.

5. The process of claim 1 wherein the monoanhydride of a polycarboxylic acid is phthalic anhydride or trimellitic monoanhydride.

6. The process of claim 1 wherein more than 5% of the $R^2$ groups are phenyl groups.

7. A heat-curable binder produced by the process of claim 1.

8. A heat-curable binder produced by the process of claim 2.

9. A heat-curable binder produced by the process of claim 3.

10. A heat-curable binder produced by the process of claim 4.

11. A heat-curable binder produced by the process of claim 5.

12. A heat-curable binder produced by the process of claim 6.

13. A coating comprising a coating agent and a binder therefore wherein the binder is the binder of claim 7.

14. The coating of claim 13 wherein the coating agent is a pigment.

15. A substrate coated with the coating of claim 13.

* * * * *